May 30, 1967  R. P. BASH  3,322,220
ELECTRICAL LOAD-MEASURING DEVICE FOR VEHICLES
Filed Oct. 7, 1965                                                                 2 Sheets-Sheet 1
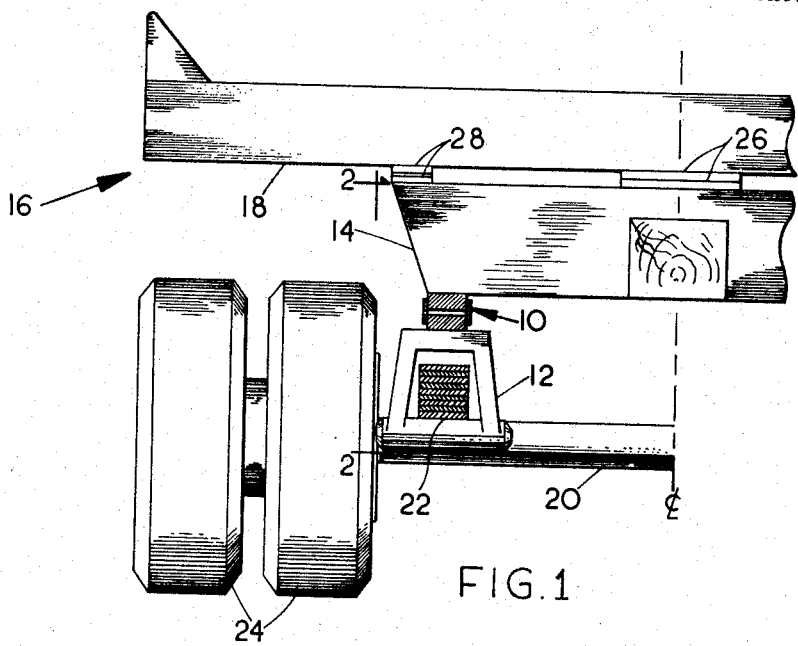
FIG. 1
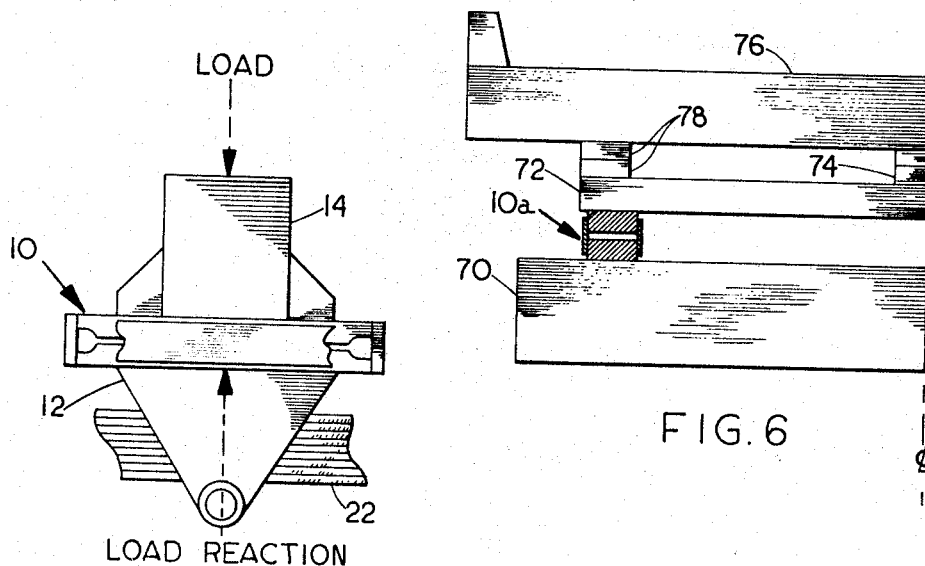
FIG. 2
FIG. 6
ROBERT P. BASH
INVENTOR
BY
BUCKHORN, BLORE, KLARQUIST & SPARKMAN
ATTORNEYS May 30, 1967     R. P. BASH     3,322,220
ELECTRICAL LOAD-MEASURING DEVICE FOR VEHICLES
Filed Oct. 7, 1965     2 Sheets-Sheet 2

ROBERT P. BASH
INVENTOR
BY
BUCKHORN, BLORE, KLARQUIST & SPARKMAN
ATTORNEYS

United States Patent Office 3,322,220
Patented May 30, 1967

3,322,220
ELECTRICAL LOAD-MEASURING DEVICE
FOR VEHICLES
Robert P. Bash, Rte. 1, Box 846B,
Cottage Grove, Oreg. 97424
Filed Oct. 7, 1965, Ser. No. 493,694
5 Claims. (Cl. 177—137)

The present invention relates to a device for measuring the load carried by a vehicle and more specifically to an electrical load-measuring device adapted for incorporation as part of the vehicle itself.

Heretofore axle loads on vehicles have most commonly been measured with hydraulic devices placed between the axles and the load-bearing frame. Such hydraulic devices, however, tend to become inaccurate after relatively short periods of use and underweigh the load carried because the orifices therein readily become plugged with dirt and other foreign matter. These hydraulic devices are particularly troublesome when used on vehicles such as log trucks and trailers which travel over gravel and dirt roads much of the time. It is particularly important that commercial vehicles carrying large loads be equipped with accurate load-measuring devices inasmuch as state laws impose severe fines on truckers whose vehicles are overloaded, such fines often being based on the number of pounds that the vehicle is overweight. On the other hand, truckers paid on the basis of payload carried lose money when driving vehicles that are loaded below the allowable limit.

Although electrical load-measuring devices have been proposed heretofore, such devices have proved unsatisfactory because they too usually become inaccurate after a relatively short period of use due to the fact that they are usually designed to measure the load indirectly through measurement of the deflection of an axle, spring or other vehicle element that is subject to variations in deflection for a given load after repeated loadings because of the relatively flexible nature of the element, or because of overstressing and fatigue stressing of the part involved.

The present invention is an improvement over prior electrical devices for measuring vehicle loads primarily in that it includes transducer elements which form part of the structural portion of the vehicle through which the entire load supported on a given set of axles is transmitted. Such transducer elements have sufficient strength and rigidity such that their deformation is linearly proportional to the loads imposed on such members under all conditions of loading and such that the transducer elements are never stressed beyond their proportional limit strength.

Accordingly a primary object of the invention is to provide a load-measuring device for vehicles which will accurately register the load on said vehicle.

Another important object is to provide an electrical load-measuring device for vehicles which is unaffected by dirt and foreign matter.

Another object is to provide a load-measuring device as aforesaid which will remain accurate for long periods of time and substantially for the life of the vehicle.

A specific object of the invention is to provide a load-measuring device which is incorporated as a load-supporting part of the vehicle frame.

A further specific object is to provide a load-measuring device through which the entire load to be measured is transmitted.

Another object is to provide a load-measuring device which is simple and inexpensive to manufacture, install and maintain.

The above and other objects and advantages of the present invention will become more apparent from the following detailed description which proceeds with reference to the accompanying drawings wherein:

FIG. 1 is a rear end elevational view of one longitudinal half of a log trailer incorporating a transducer unit of a load-measuring device of the present invention, with the transducer unit being shown in section;

FIG. 2 is a side elevational view of a portion of the trailer of FIG. 1 incorporating a transducer unit of the load-measuring device, taken approximately along the line 2—2 of FIG. 1;

FIG. 6 is a schematic elevational view of one longitudinal half of a log truck used to tow the trailer of FIG. 1.

Figure 3:
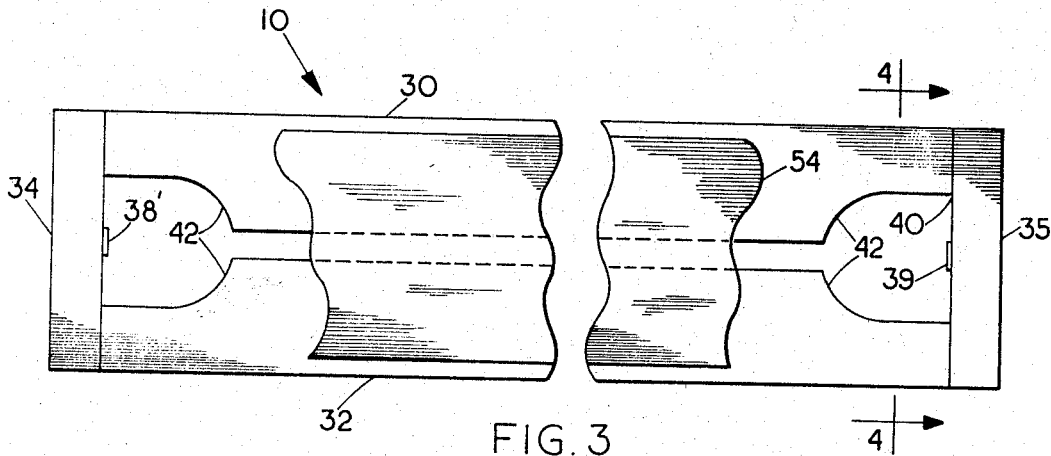
FIG. 3 is an enlarged side elevational view of one of the tranducer units forming part of the load-measuring device, with an outer side shield portion of the unit being broken away to reveal the internal structure of such unit.

With reference to the drawings, there is shown in FIG. 1 one of a pair of transducers 10 mounted between a tandem trunnion 12 and the frame 14 of a log-carrying trailer 16 for measuring the load transmitted from the frame and a bunk 18 supporting a load of logs (not shown) to a pair of rear axles 20 (only one of which is shown) through leaf springs 22 carried by the trunnion. Mounted at each end of each axle are dual wheels 24 supporting the rear end of the trailer on the ground surface. Bearing plates 26 support the bunk on the frame, and wear plates 28 separate the outer ends of the frame from the bunks. The foregoing-described trailer construction, except for the transducers, is conventional in the logging vehicle art. The other (not shown) of the pair of transducers 10 is positioned between the opposite side of the frame 14 and another trunnion in exactly the same manner as illustrated. Thus, it will be apparent from FIG. 2 that the entire load transmitted by the upper frame portion of the trailer to the rear axles is supported by and passes through the two transducer units 10.

Figure 7:
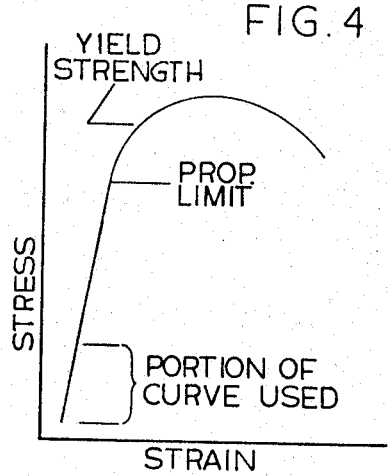
FIG. 7 is a typical stress-strain diagram for the end members of the transducer units.

Referring to FIG. 3, each transducer unit 10 includes an upper beam member 30 of rectangular cross section which engages the frame 14 and a lower beam member 32 also of rectangular cross section in engagement with the trunnion and spaced slightly beneath the upper beam by a pair of rectangular end members 34, 35. The end members are preferably affixed to the beam members by welding to provide a high strength joint. The beam members and end member are made of high strength steel or other suitable and substantially rigid material having sufficient strength to easily support any load that might be expected to be transmitted through such members. In particular the end members should be of a size and material such that under repeated loads they will undergo a predictable and predetermined uniform deformation, or strain, that is linearly proportional to the load, or stress, applied under all loading conditions of the vehicle so as to provide accurate load readings over the life of the vehicle. The stress-strain diagram for a material such as steel having suitable characteristics for use as end members is shown in FIG. 7. From the straight line portion of such diagram it will be seen that the strain of the material is directly proportional to the applied stress almost to the upper limit of stress (yield strength) that the material is capable of withstanding. In practice, the end members are designed such that the stresses to which they are subjected will range through only about the lower one-third or less of the straight-line portion of the diagram.

Figure 4:
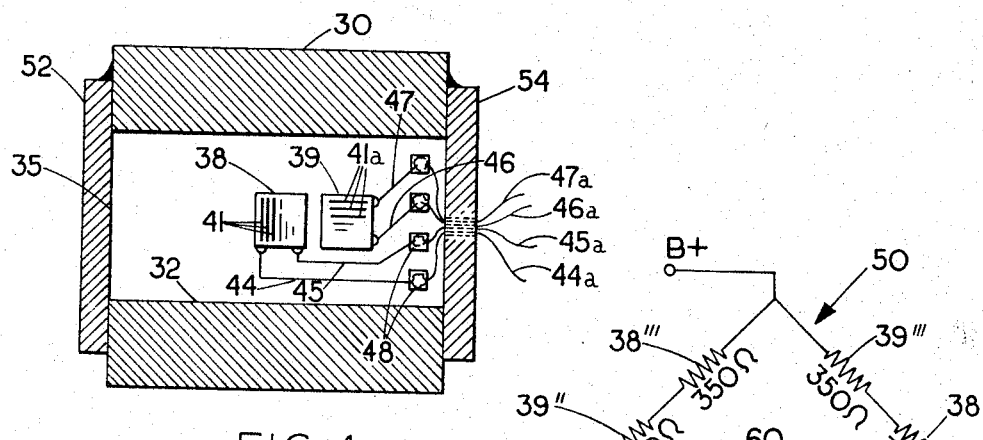
FIG. 4 is a sectional view taken along the line 4—4 of FIG. 3 on a scale somewhat enlarged from that of FIG. 3.
Figure 5:
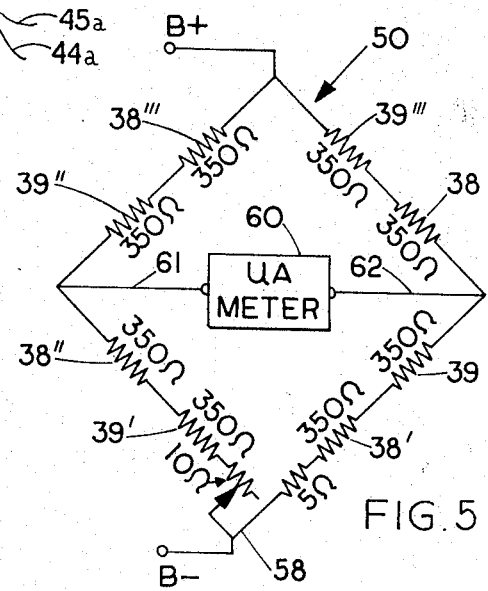
FIG. 5 is a diagram of the electrical circuit in which the strain gauges of the transducer unit of FIG. 3 is incorporated.

As shown most clearly in FIG. 4 a pair of electrical resistance strain gauges 38, 39 is affixed to the inside surface 40 of each end member. One gauge 38 is positioned with its electrically conductive wires 41 extending vertically so that their resistances change in proportion to the load applied to the end member, whereas the other gauge 39 is positioned with its resistance wires 41a extending horizontally so that it serves as a temperature-compensating gauge only. In order to accommodate the strain gauges on the inside surfaces of the end members, the upper and lower beams have cut-away inner end portions 42 providing a hollowed-out cavity exposing sufficient surface areas on the inner faces of the end members to receive the two strain gauges. Four very fine gauge conductor wires 44, 45, 46, 47 lead two from each strain gauge to four solder terminals 48 at one side of the inner end surface. From such terminals four heavier gauge lead wires 44a, 45a, 46a, 47a connect the strain gauges in a Wheatstone bridge circuit 50 as shown in FIG. 5 and described below. The arrangement of another pair of strain gauges and their connections on the inner surface of end member 34 is identical to that just described with respect to end member 35.

A pair of side shields 52, 54 cover both sides of each transducer, including the strain gauge cavities, to provide protection for the strain gauges and to prevent dirt, grime and foreign objects from damaging the strain gauges, thereby prolonging the life of the transducer unit. As will be evident from FIG. 4, each shield has a height slightly less than the overall height of the transducer unit and is affixed as by welding only to a side of the upper beam 30, at a position thereon to provide clearance between the upper and lower ends of the shield and the upper and lower extremities of the transducer unit so that the shields will not interfere with the normal deformation under load of the beams and end members.

The strain gauges of the two transducer units which support the upper frame portion of the trailer on the rear trunnions, that is, a total of eight gauges, are incorporated in a common bridge circuit 50, shown in FIG. 5, in a manner to register the total load being transmitted by the upper frame portion of the trailer to the rear axles. In the bridge circuit, the active, load-measuring strain gauge 38 on end member 35 is represented by one 350 ohm resistance on one side of the bridge, and its paired temperature-compensating gauge 39 is represented by another 350 ohm resistance on an adjacent side of the bridge. The pair of active and compensating gauges 38' and 39' on the opposite end member 34 of the same transducer unit are represented by a second pair of 350 ohm resistances adjacent another corner of the bridge, while gauges 38", 39" and 38''', 39''' represent the two pairs of strain gauges on the other transducer unit 10 at the rear of the trailer. The circuit also includes a potentiometer 58, represented by the ten and five ohm resistances, for zeroing a galvanometer, more specifically a microammeter 60, connected diagonally across the bridge circuit by conductors 61, 62.

In practice, both the ammeter 60 and potentiometer 58 are mounted in the cab of the truck which tows the trailer so that the driver can adjust his instruments and take a reading without leaving his seat. Similarly, the battery which supplies current to the circuit is carried on the truck frame, remote from the strain gauges. The ammeter would be zeroed with the trailer empty so that the ammeter will register directly the load added to the trailer and supported on the rear axles.

To measure the portion of the load on the trailer being transmitted to the truck axles, another pair of transducers 10a in a separate bridge circuit (not shown) is positioned between the truck frame 70 and the fifth wheel assembly 72 of the truck, as shown in FIG. 6. The fifth wheel assembly in turn supports at a pivotal connection 74, a forward bunk 76, which is given lateral stability by a pair of wear plates 78. The transducer units 10a are of the same construction as those previously described, and are connected in an identical manner in another bridge circuit like that of FIG. 5 so that separate load readings can be taken for the portions of the trailer load being transmitted to the truck and trailer axles since most highway weight restrictions are specified in terms of an allowable load per axle, or set of axles.

Log trailer application

An example of one design of the foregoing device for a log trailer application is as follows, assuming a 33,000 pound per axle (or per tandem axle) weight restriction: The trailer itself weighs about 7000 pounds, permitting a load of about 26,000 pounds (33/7) to be supported on the trailer axles. This means that if two transducer units are to be placed between the frame and trunnions of the trailer, each transducer must be capable of supporting the weight of one-half the upper frame portion of the trailer plus 13,000 pounds (26/2). Thus each end member of each transducer must support 6500 pounds of the load (13/2) plus about one-quarter the weight of the trailer (1750 lbs.), or a total of 8250 pounds. A high-strength steel having a yield strength of about 30,000 p.s.i. was selected for the end members, and each end member had cross-sectional dimensions of two inches by five-eighths of an inch, and therefore a cross-sectional area of 1.250 in.$^2$. Thus each end member is, under most static loading conditions, subjected to a maximum unit stress of about 6600 pounds (8250/1.250) which is far less than one-third and not more than about one-fourth the yield strength and proportional limit (the upper limit of the straight-line portion of the curve) of the metal of the end member, as indicated in FIG. 7.

In the same log trailer application, upper and lower beams of high strength steel having a one-inch thickness at their midportions should be ample, with approximately a one-half inch spacing being provided between beams. An overall length of about seventeen inches for each transducer should be satisfactory for mounting the transducer on a trunnion of the trailer in the same application.

It is to be understood, of course, that the above dimensions and strengths and materials are exemplary only, and no doubt other designs would also prove satisfactory for the same application.

In general, it is preferred to provide a sufficient cross-sectional dimension on the end members such that no more than between about one-fourth to one-third of the proportional limit strength of the material of the end member will be utilized in supporting a load so that the end members will have a long life with a constant, predictable deformation under given repeated loads, without any appreciable permanent deformation due to fatigue or applied stresses exceeding the elastic limit or yield strength of the end members. If the above conditions are met, each transducer unit should give accurate readings for substantially the life of the trailer or other vehicle of which it forms a part.

The foregoing beam and end member design of the transducer units is advantageous in that the deformation of the inner surfaces of the end members are exaggerated somewhat over what they would be in direct compression only, since the beams, being center-loaded, will apply a bending stress in compression to the inner surfaces of such end members in addition to the normal direct compressive stresses. This, of course, is taken into consideration in calibrating the galvanometer 60 for a particular end member material and transducer design so that galvanometer readings will accurately correspond to the payload being supported by the transducers.

If desired, the temperature-compensating strain gauge 39 on each end member could be affixed to the surface opposite that on which the load-measuring gauge 38 is affixed and with the resistance wires 41a thereof in the same orientation as those of the latter gauge so as to give an amplified reading on the microammeter. However, with such an arrangement, the outer strain gauge would not be protected within the shield.

A load-measuring device as described has utility in measuring the load carried by any ground-engaging vehicle. The transducers could, with slight modification, be mounted directly on the vehicle axle or at any other location between the ground surface and the load carried on the frame so long as the load on the frame is transmitted directly through the transducers. Any number of transducers can be used to measure a given load, depending on their relative strengths as compared to the loads to be measured and their positions on the vehicle. In most axle-supported vehicles, however, it will be most economical and convenient to provide only two transducers for each axle-load to be measured.

Having illustrated a preferred form of the invention, it should be apparent to those skilled in the art that the invention permits of modification in arrangement and detail. I claim as my invention all such modifications as come within the true spirit and scope of the following claims.

I claim:

1. A load-cell transducer device for placement between an upper frame portion and a lower frame portion of a vehicle for transmitting loads between said frame portions and measuring changes in said loads, said device comprising:

an upper elongate beam portion for engaging said upper frame portion, a lower beam portion spaced beneath said upper beam portion for engaging said lower frame portion, a pair of rigid end portions separating and rigidly interconnecting said beam portions at the opposite ends of the latter, said end portions each being of sufficient strength and rigidity to support a predetermined proportion of the weight of said upper frame portion and the loads thereon on said lower frame portion without deforming beyond the proportional limit of strength of each end member, such that the strains imposed on said end members will bear a proportional relationship to the stresses thereon due to the loading of said upper frame portion, and a pair of electrical resistance strain gauges affixed to each said end member including, one attached to an inwardly facing surface of each end portion so as to measure strains in bending compression induced by loading of said upper beam portion, and the other for measuring strains on said end portion caused by variations in temperature.

2. A load-cell transducer device according to claim 1 wherein each said end portion includes a vertically disposed planar inner surface directed inwardly of the ends of said beam members, at least one of said strain gauges on each said end member being affixed to said planar surface, in a central portion thereof in a position for measuring deformations of said surface portion caused by the loading on said upper frame.

3. In combination with a ground engaging vehicle having an upper load supporting frame portion and a lower ground engaging frame portion, a load measuring device integral with said vehicle comprising:

a plurality of unitary load cells positioned between said upper frame portion and said lower frame portion and supporting the entire load of said upper frame portion on said lower frame portion, each of said load cells including:

an elongate, horizontally disposed upper beam portion rigidly connected to the upper frame portion of said vehicle, an elongate, horizontally disposed lower beam portion extending parallel to said upper beam portion and spaced vertically beneath said upper beam portion a distance sufficient to permit deflection of said upper beam portion under a predetermined load without engaging said lower beam portion, said lower beam portion being rigidly connected to the lower frame portion of said vehicle, a pair of vertically extending opposite end portions rigidly interconnecting and forming an integral continuation of the opposite ends of said upper and lower beam portions, each of said end portions having a vertically disposed, substantially flat, inwardly facing surface extending between said upper and lower beam portions, a strain gauge affixed to said inwardly facing surface of each end portion in a position for measuring deformations of said surface in compression, said end portions extending outwardly beyond the adjacent upper and lower frame portions of said vehicle to which said beam portions are attached so that said end portions are free of any direct engagement with said upper and lower frame portions and so that said upper beam portion transmits load stresses from said upper frame portion to said end portions, in bending whereby deformation of said end portions at said inner surfaces are in bending compression and thereby greater than would otherwise occur in pure compression.

4. In combination with a ground engaging vehicle having an upper load supporting frame portion and a lower ground engaging frame portion, a load measuring device integral with said vehicle comprising:

a plurality of unitary load cells positioned between said upper frame portion and said lower frame portion and supporting the entire load of said upper frame portion on said lower frame portion, each of said load cells including:

an elongate, generally rectangular block adapted for horizontal mounting between vertically spaced frame portions of a vehicle to transmit loads therebetween, said block including opposite outer end surfaces, opposite side surfaces, and top and bottom surfaces, said block including a horizontal slot extending centrally through said block from one side to the other thereof and from a position inwardly adjacent one end to a position inwardly adjacent the opposite end of said block so as to divide said block into an upper beam portion spaced from a lower beam portion and joined together by opposite end portions, said slot being sized so as to permit deflection of a central portion of said upper beam portion toward said lower beam portion without engaging said lower beam portion upon the imposition of a predetermined load on said upper beam portion intermediate the said opposite end portions, said slot being enlarged at its opposite ends to define a pair of longitudinally opposed cavities inwardly of the opposite ends of said block, the end portions of said block each including a flat vertical inwardly facing end surface defining one wall of said cavity, a strain gauge affixed to and centered on each of said vertical end surfaces in a position for measuring compressive stresses imposed on said wall through loading of said upper beam portion.

5. A transducer device according to claim 4 including a pair of side shield members enclosing the space between said beam members and said cavities, each of said shields being affixed to no more than one of the two said beam members.

References Cited

UNITED STATES PATENTS

| 2,814,946 | 12/1957 | Harris | 177—211 X |
| 3,063,576 | 11/1962 | Hofmeister | 177—139 X |
| 3,146,838 | 9/1964 | Carlson | 177—136 |
| 3,199,619 | 8/1965 | Hathaway | 177—211 X |

RICHARD B. WILKINSON, *Primary Examiner*

G. H. MILLER, *Assistant Examiner*.